(12) United States Patent
Lakshmanamurthy et al.

(10) Patent No.: US 7,698,498 B2
(45) Date of Patent: Apr. 13, 2010

(54) MEMORY CONTROLLER WITH BANK SORTING AND SCHEDULING

(75) Inventors: Sridhar Lakshmanamurthy, Sunnyvale, CA (US); Dharmin Y. Parikh, Chandler, AZ (US); Karthik Vaithianathan, Chandler, AZ (US); Gary Lavelle, Newtown, PA (US); Atul Kwatra, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 11/321,273

(22) Filed: Dec. 29, 2005

(65) Prior Publication Data

US 2007/0156946 A1    Jul. 5, 2007

(51) Int. Cl.
G06F 12/00    (2006.01)
G06F 13/14    (2006.01)

(52) U.S. Cl. ............... 711/105; 711/104; 711/167; 710/6

(58) Field of Classification Search ................ 711/104, 711/105, 167; 710/6
See application file for complete search history.

(56) References Cited

U.S. PATENT DOCUMENTS

| | | | |
|---|---|---|---|
| 5,706,482 A * | 1/1998 | Matsushima et al. ........ | 345/535 |
| 5,732,236 A | 3/1998 | Nguyen | |
| 5,987,574 A | 11/1999 | Paluch | |
| 6,460,120 B1 * | 10/2002 | Bass et al. ................. | 711/148 |
| 6,564,284 B2 | 5/2003 | Christenson | |
| 6,615,326 B1 | 9/2003 | Shuaibin | |
| 6,687,172 B2 | 2/2004 | Wilcox | |
| 6,687,247 B1 * | 2/2004 | Wilford et al. ............. | 370/392 |
| 6,769,047 B2 | 7/2004 | Kurupati | |
| 6,829,689 B1 * | 12/2004 | Van Dyke ................... | 711/167 |
| 6,944,728 B2 * | 9/2005 | Calderon et al. ............ | 711/157 |
| 7,296,112 B1 * | 11/2007 | Yarlagadda et al. ......... | 711/105 |
| 2004/0006665 A1 | 1/2004 | Moss | |
| 2004/0128428 A1 * | 7/2004 | Christenson ................... | 711/5 |
| 2004/0187122 A1 * | 9/2004 | Gosalia et al. ............. | 718/100 |
| 2005/0086559 A1 * | 4/2005 | Uysal et al. .................... | 714/6 |
| 2005/0246481 A1 * | 11/2005 | Rohit et al. ................. | 711/105 |
| 2005/0273564 A1 * | 12/2005 | Lakshmanamurthy et al. .... | 711/158 |
| 2006/0026342 A1 * | 2/2006 | Calvignac et al. ........... | 711/105 |
| 2007/0011396 A1 * | 1/2007 | Singh et al. ................. | 711/105 |

* cited by examiner

*Primary Examiner*—Shane M Thomas
(74) *Attorney, Agent, or Firm*—Ryder, Lu, Mazzeo and Konieczny, LLC; Douglas J. Ryder

(57) ABSTRACT

In some embodiments a memory controller is disclosed that includes at least one command/address input buffer to receive commands and addresses. The addresses specify a memory bank and a location within the memory bank. An arbiter, coupled to the at least one command/address input buffer, merges commands and addresses from the at least one command/address input buffer and sorts the commands and addresses based on the addresses specified. A plurality of bank buffers, coupled to the arbiter and associated with memory banks, receive commands and addresses for their associated memory banks. A scheduler, coupled to the plurality of bank buffers, groups commands and addresses based on an examination of at least one command and address from the bank buffers. Other embodiments are otherwise disclosed herein.

15 Claims, 7 Drawing Sheets

MEMORY CONTROLLER WITH BANK SORTING AND SCHEDULING

BACKGROUND

Dynamic Random Access Memory (DRAM) is used for memory applications in computer systems. DRAMs typically use a simple memory cell consisting of a charge storage element (e.g., a capacitor, a floating body of a transistor) and a one or more active devices (e.g., transistors) to read from or write to ("access") the charge storage element. Because the charge storage element in each cell slowly loses charge, DRAM cells must be periodically refreshed.

DRAM memory cells are organized into regular arrays and are accessed (through sense amplifiers) and buffered a row ("page") at a time and the process is often referred to as "opening a page". In modern DRAM devices, once a page is opened, one or more bits or words from the accessed row may be read or written thereto. In many systems, a memory controller is used to efficiently manage the read and write transactions between a processor (or processors) and one or more DRAM memory devices.

Synchronous DRAM (SDRAM) devices (e.g., double data rate (DDR)) provide increased speed. Recent generations of DDR SDRAM (e.g., DDR2 and DDR3) have bus interface frequencies and instantaneous data rates (the column access rate from an open page) ranging from 400 MHz to 800 MHz. However, the rate at which data can be written to and read from SDRAM devices is based on a number of parameters that depend on the relatively slow precharge and read/rewrite process required each time a row is accessed. For example, the minimum time period from the start of a row access to the start of a new row access (the row-cycle time (tRC)) may range from about 45 nS to about 60 nS (data rate in the range of about 16-22 MHz).

DDR SDRAM devices may use multiple memory cell arrays ("banks"), with each bank having its own sense amplifiers and buffering logic to increase performance. Some current DDR SDRAM devices support as many as 8 banks per device. Multi-bank SDRAM devices allow for the access of a new row of memory data from one bank while reading the data from an open page of another bank. Once a row within a particular bank is activated (opened), it is most efficient to get as many consecutive accesses to different columns within that same row. However, access to a different row within that bank may be limited by the tRC or other row access parameters.

BRIEF DESCRIPTION OF THE DRAWINGS

The features and advantages of the various embodiments will become apparent from the following detailed description in which.

DETAILED DESCRIPTION

Figure 1:
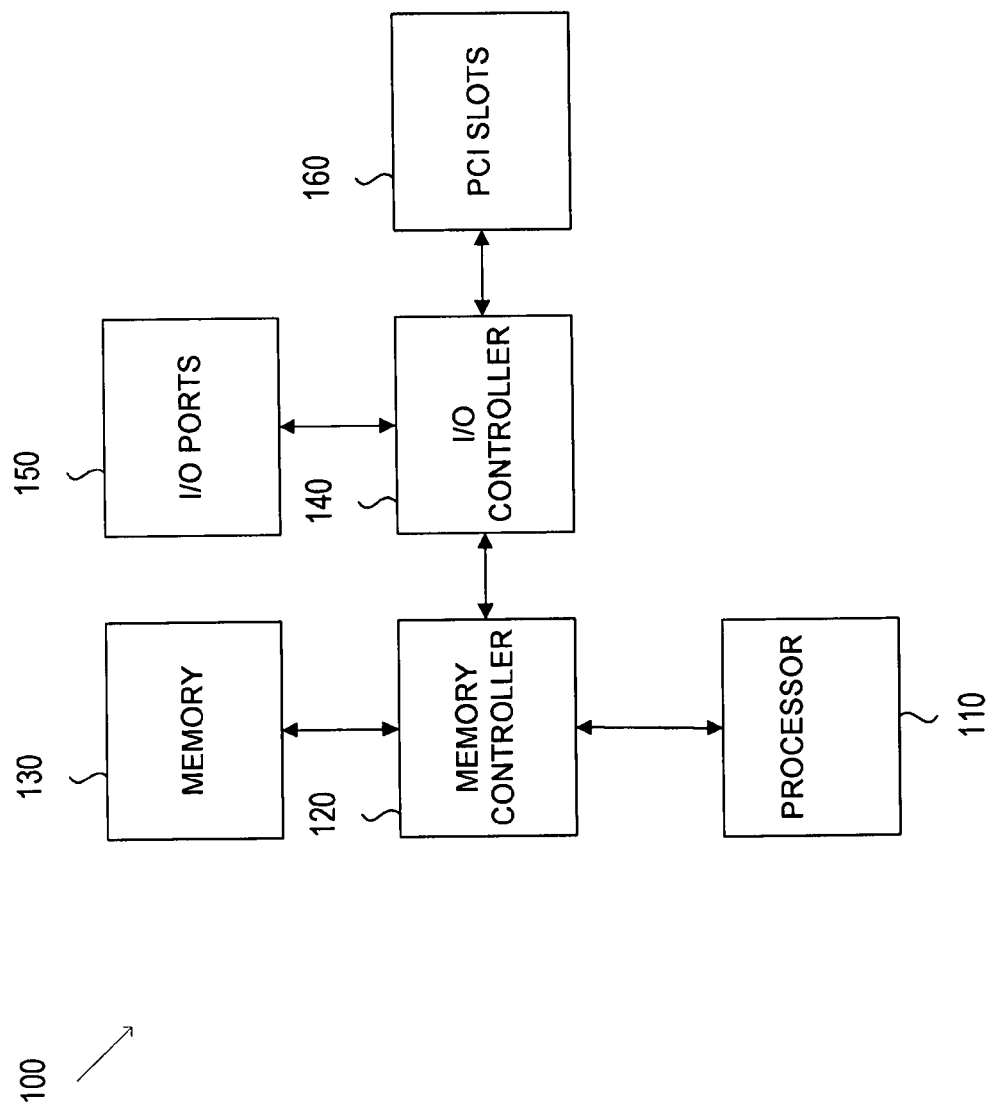
FIG. 1 illustrates an example simplified system block diagram of a computer, according to one embodiment.

FIG. 1 is a simplified functional block diagram of an example microprocessor-based computer system 100. The computer system 100 includes a processor (central processing unit (CPU)) 110, a memory controller 120, system memory 130, an input/output (I/O) controller 140, I/O ports 150, and Peripheral Component Interconnect bus (PCI) slots 160 adhering to the PCI Local Bus Specification Revision 2.1 developed by the PCI Special Interest Group of Portland, Oreg. Other components typically used in the computer system 100, but not illustrated, include one or more hard disk drives, one or more optical disk drives (e.g., CD-ROM, DVD-ROM), one or more network interfaces, a video/graphics interface and adapter, a video monitor, and a keyboard. A power supply (not shown) is also required to provide one or more DC voltages appropriate for use by the various components of the computer system 100.

The processor 110 may be a traditional processor. For example, the processor 110 may be a particular member of the Intel® family of processors, including the Pentium® II, Pentium® III, Pentium® IV, Pentium® 4 Processor-M, and Itanium processors available from Intel Corporation of Santa Clara, Calif. The processor 110 may be a network processor. The processor 110 may be a single processor or may be multiple processors. If the processor 110 is multiple processors, the multiple processors may consist of multiple chips, may consist of a single chip with multiple processors (multi-core processor), or some combination thereof. If multiple processors the processors may be the same type or may be of a different type.

The system memory 130 stores data and program instructions that may be used by the processor 110. The system memory 130 may include dynamic random access memory (DRAM) or may be implemented using other memory technologies. The I/O controller 140, coupled to the memory controller 120, provides an interface to most I/O devices within the computer system 100. The I/O controller 140 may be coupled to one or more of the I/O ports 150, which may include RS-232 serial ports, parallel ports, and Universal Serial Bus (USB) ports. The USB ports are specified by the Universal Serial Bus Revision 1.1 specification or the Universal Serial Bus Revision 2.0 specification, both from the USB Implementers Forum, Inc. of Portland, Oreg. The I/O controller 140 may also be coupled to one or more of the PCI slots 160.

The functional blocks of FIG. 1 are not intended to illustrate a particular partitioning of functionality into integrated circuits (ICs). Rather, the functionality may be partitioned into ICs in any manner without departing from the scope. For example, the memory controller 120 may be a separate IC or may be incorporated on the same die as the processor 110. The memory controller 120 may be incorporated onto one or more ICs that form the system memory 130.

Figure 2A:
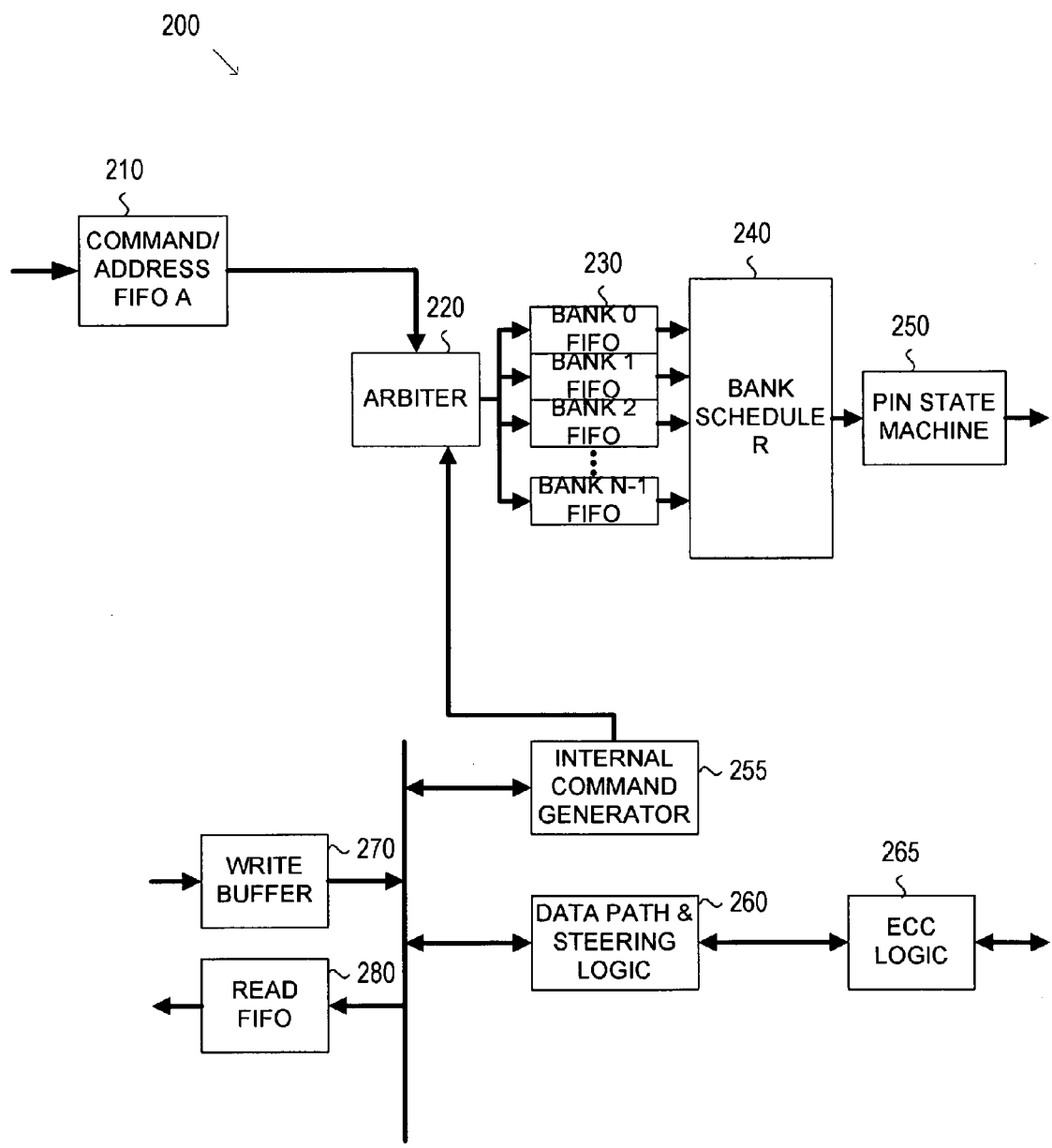
FIGS. 2A-C illustrate example memory controllers, according to one embodiment.

FIG. 2A illustrates an example memory controller 200 (e.g., 120 of FIG. 1). The memory controller 200 may support coherent streams having sequential or nearly sequential memory access (e.g., streams from a traditional processor), non-coherent streams having non-sequential or random memory access (e.g., streams from a network processor), and/or different types of streams with various memory access characteristics and requirements.

The memory controller 200 includes a command/address First-In-First-Out buffer (FIFO) 210, an arbiter 220, a bank FIFO set 230 having plurality of bank FIFOs (labeled 0 to N−1), a bank scheduler 240, a pin state machine 250, an internal command generator 255, a data path and steering logic 260, an ECC logic 265, a write buffer 270, and a read FIFO 280. The memory controller 200 may service commands (requests to read or write data) from one or more masters (e.g., processor 110 of FIG. 1). The commands and addresses associated therewith enter the memory controller 200 and are buffered in the command/address FIFO 210. Read requests may be tagged to allow proper association of read requests and data from one or more memory devices (not shown).

The outputs from command/address FIFO 210 are fed into the arbiter 220. The arbiter 220 sorts memory requests into appropriate bank FIFOs from the bank FIFO set 230. The arbiter 220 may use a simple round robin arbitration scheme to sort and prioritize the input request streams. The arbiter 220 may also arbitrate between the memory requests and commands from an internal command generator 255 (discussed later). The appropriate bank may be determined by examination of one or more address bits in each command/address input. The sorted requests are fed into the appropriate bank FIFOs from the bank FIFO set 230. The number of bank FIFOs is equal to the number (N) of banks in the target memory devices (not shown). For example, where the target memory devices contain eight banks there are eight bank FIFOs.

The bank scheduler 240 receives the outputs from the bank FIFO set 230. The bank scheduler 240 processes the requests in rounds. In each round, the bank scheduler 240 may select the transactions that optimize read/write efficiency and maximize the use of memory "pin" bandwidth. The bank scheduler 240 may minimize bank conflicts by sorting, reordering, and clustering memory requests to avoid back-to-back requests of different rows in the same bank. The bank scheduler 240 may avoid requests of different rows in the same bank for at least the row-cycle time (tRC), which is the minimum time period required between the start of a row access to the start of a new row access, so that the tRC does not effect the speed by which the requests are processed.

The bank scheduler 240 may also group reads and/or writes to minimize read-write turn-arounds. For example, up to eight like transactions may be collected before switching to the other type (e.g., from read to write, from write to read). The bank scheduler 240 may select either all reads or all writes targeted to different banks and schedule these transactions for a particular round of scheduling.

The bank scheduler 240 may also maintain a tRC timer for each bank. The tRC timer for a specific bank may be started when a request is issued to the specific bank. The bank scheduler 240 will not allow another request for the specific bank for at least a time equal to the tRC. The bank scheduler 240 may set the tRC timer to the tRC time and have it count down to zero, or may reset the tRC time to zero and have it count up to tRC. The specific bank becomes eligible again to receive a new transaction after the time equal to the tRC (e.g., timer reaches 0, timer reaches tRC).

For each round the bank scheduler 240 may select a specific transaction type (e.g., read, write) from each bank FIFO in the bank FIFO set 230 that have an associated tRC value indicating the associated bank FIFO is capable of performing a next transaction (e.g., zero, tRC) and having the specific transaction type (e.g., read, write) at the head of the associated bank FIFO. The bank scheduler 240 may select up to a certain (e.g., 8) number of the specific transaction types. The bank scheduler 240 may be configured to switch the transaction type at the beginning of each new round. For each round, the bank scheduler 240 may maintain a count of the number of bank FIFOs skipped because the transaction at the head of the FIFO is not of the correct type (e.g., read instead of write, write instead of read). The bank scheduler 240 may be programmed to switch if the skip count is greater than a certain value.

The bank scheduler 240 may examine transactions further into each FIFO bank and consider more than just the head element as a candidate to be scheduled ("look-at-N scheduler", where N can be any integer from 2 to the size of the bank FIFO). The look-at-N scheduler 240 may scan the first N elements of each bank FIFO to pick a specific transaction type. For example, if the specific transaction type for a given round is a "read" and N=3, the look-at-N bank scheduler 240 may select a read transaction from a first (head), second or third transaction in the bank FIFOs having an appropriate tRC timer value (e.g., 0, tRC). The look-at-N bank scheduler 240 increases the probability of finding the required transaction-type since multiple elements from each bank FIFO are scanned.

The look-at-N bank scheduler 240 enables read transactions to bypass write transactions or writes to bypass reads. An "out-of-order" mechanism may be used to ensure that the transaction ordering rules governing reads and writes to the same address are never violated. The out-of-order mechanism may also ensures that reads are not allowed to bypass other reads and writes are not allowed to bypass other writes within the bank FIFO. The out-of-order mechanism may tag each incoming read request (for coherent streams) and provide a score-board mechanism to buffer read data returned from the memory devices (not shown). The tag for each unit of returned data may be compared with the tags stored in the scoreboard, and the data may be sorted in age order. The scoreboard ensures that the data for the oldest read request is always returned ahead of data for newer read requests.

The output of bank scheduler 240 is processed by the pin state machine 250 to produce address, command, and control signals necessary to send read and write transactions to the attached memory devices (not shown). The internal command generator 255 performs maintenance functions, including DRAM refresh generation, correcting single bit error correction (ECC) errors encountered upon DRAM reads, and periodic memory scrubbing to find ECC errors that may have developed in DDR locations not recently read. Since the maintenance functions require little memory bandwidth, they arbitrate for access to the bank fifos (via the arbiter 220) in a round robin fashion with the primary request streams received by the command/address FIFO 210.

Write data enters the memory controller 200 through the write buffer 270. The write data may be merged into the data path and steering logic 260, processed by the ECC logic 265, and forwarded via a data bus to data pins of the memory devices (not shown). Data being read from the memory devices is received from the data bus and processed by the ECC logic 250. The read data is distributed, and possibly reordered, by the data path and steering logic 260 to the appropriate processors. The data path and steering logic 260 receives the read data in the order which it was accessed from the memory devices. The order may not be the same as the order in which the read commands were presented from a processor because the scheduler may issue commands to the DRAM in an out of order sequence, in order to maximize DRAM bandwidth.

The data path and steering logic 260 determines where the read data is being routed to (e.g., what type of processor requested the data). A non coherent processor (e.g., network processor) can receive the reads out of order and reorder the data, based on sequence tags applied to both the original read command, and the associated read data. Accordingly, the data path and steering logic 260 simply routes the read data to the non-coherent processor that initiated the read transaction via the read FIFO 280. A coherent processor (e.g., traditional processor) must receive the reads in the same order the read commands were presented. Accordingly, the data path and steering logic 260 enqueues the read data and performs the reordering, based on sequence tags associated with both the original read requests, and the associated read return data and routes the reordered data to coherent processor that initiated the read transaction via the read FIFO 280.

Figure 2B:
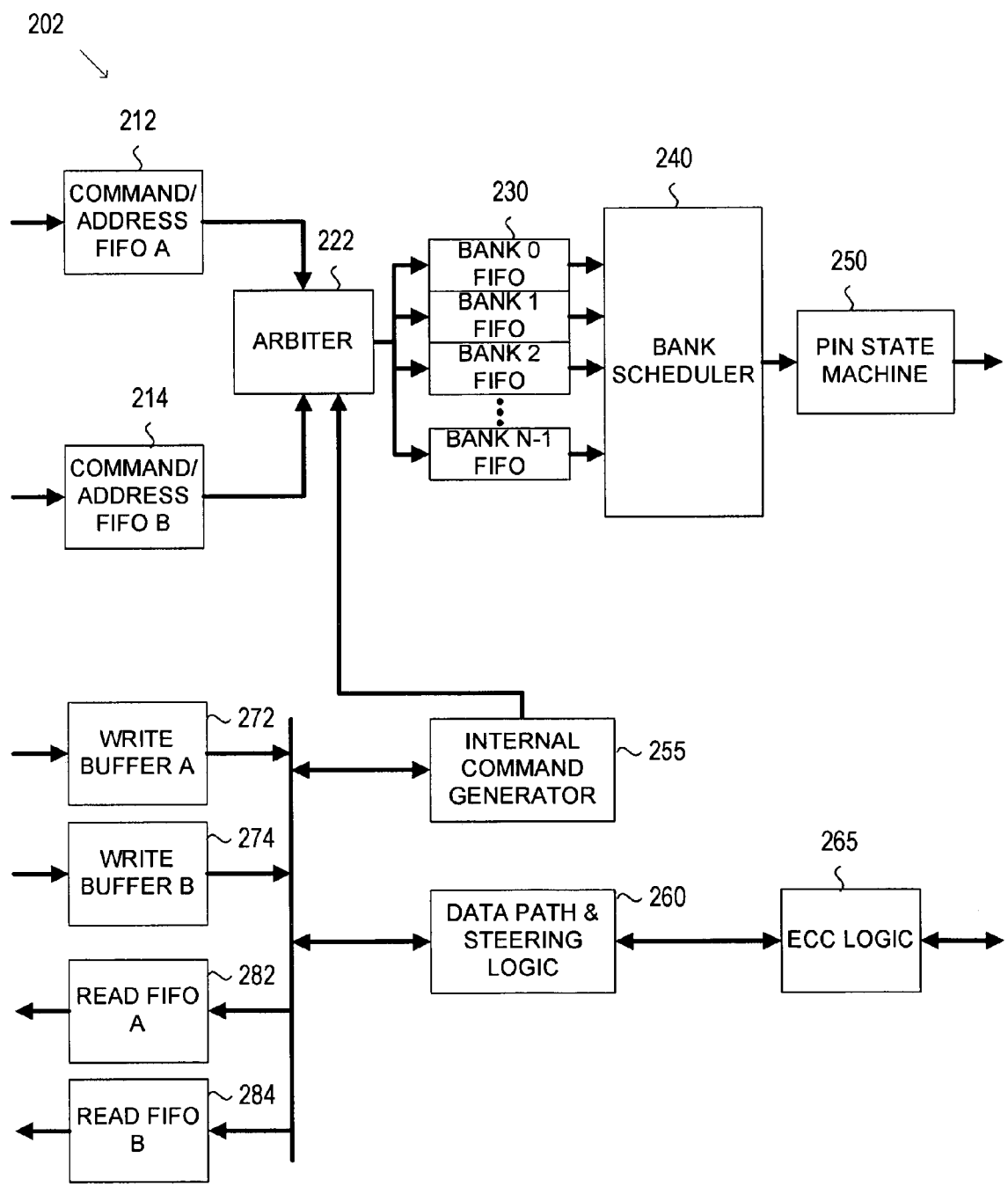

FIG. 2B illustrates an example memory controller 202 that may service commands (requests to read or write data) from two or more masters (processors). The masters may be coherent processors, non-coherent processors, other types of processors, or some combination thereof. For ease of description and for clarity we will discuss the memory controller 202 receiving commands from two processors, a "coherent" processor A and a "non-coherent" processor B). However, the various embodiments are not limited thereto.

The memory controller 202 includes command/address FIFO A 212, command/address FIFO B 214, an arbiter 222, a write buffer A 272, a write buffer B 274, a read FIFO A 282, a read FIFO B 284, as well as the bank FIFO set 230 having plurality of bank FIFOs (labeled 0 to N−1), the bank scheduler 240, the pin state machine 250, the internal command generator 255, the data path and steering logic 260, and the ECC logic 265.

The coherent stream commands and addresses enter the memory controller 202 via a coherent input and are buffered in the command/address FIFO A 212. The non-coherent stream commands and addresses enter memory controller 202 via a non-coherent input and are buffered in command/address FIFO B 214. Both the coherent and non-coherent read requests may be tagged to allow proper association of read requests and data from one or more memory devices (not shown).

The outputs from command/address FIFO A 212 and command/address FIFO B 214 are fed into the arbiter 222. The arbiter 222 may use a simple round robin arbitration scheme to merge the coherent and non-coherent input request streams. In other embodiments, a more complex arbitration scheme, such as weighted round robin, may be used. The arbiter 222 may also receive commands from the internal command generator 255 and arbitrate between the commands and the requests.

The coherent write data enters the memory controller 202 through the write buffer A 272 and the non-coherent write data enters the memory controller 202 through the write buffer B 274. The data path and steering logic 260 enqueues the coherent read data and performs the reordering, based on sequence tags associated with both the original read requests, and the associated read return data and routes the reordered data to the coherent processor that initiated the read transaction via the read FIFO A 282. The data path and steering logic 260 simply routes the non-coherent read data to the non-coherent processor via the read FIFO B 284.

Figure 2C:
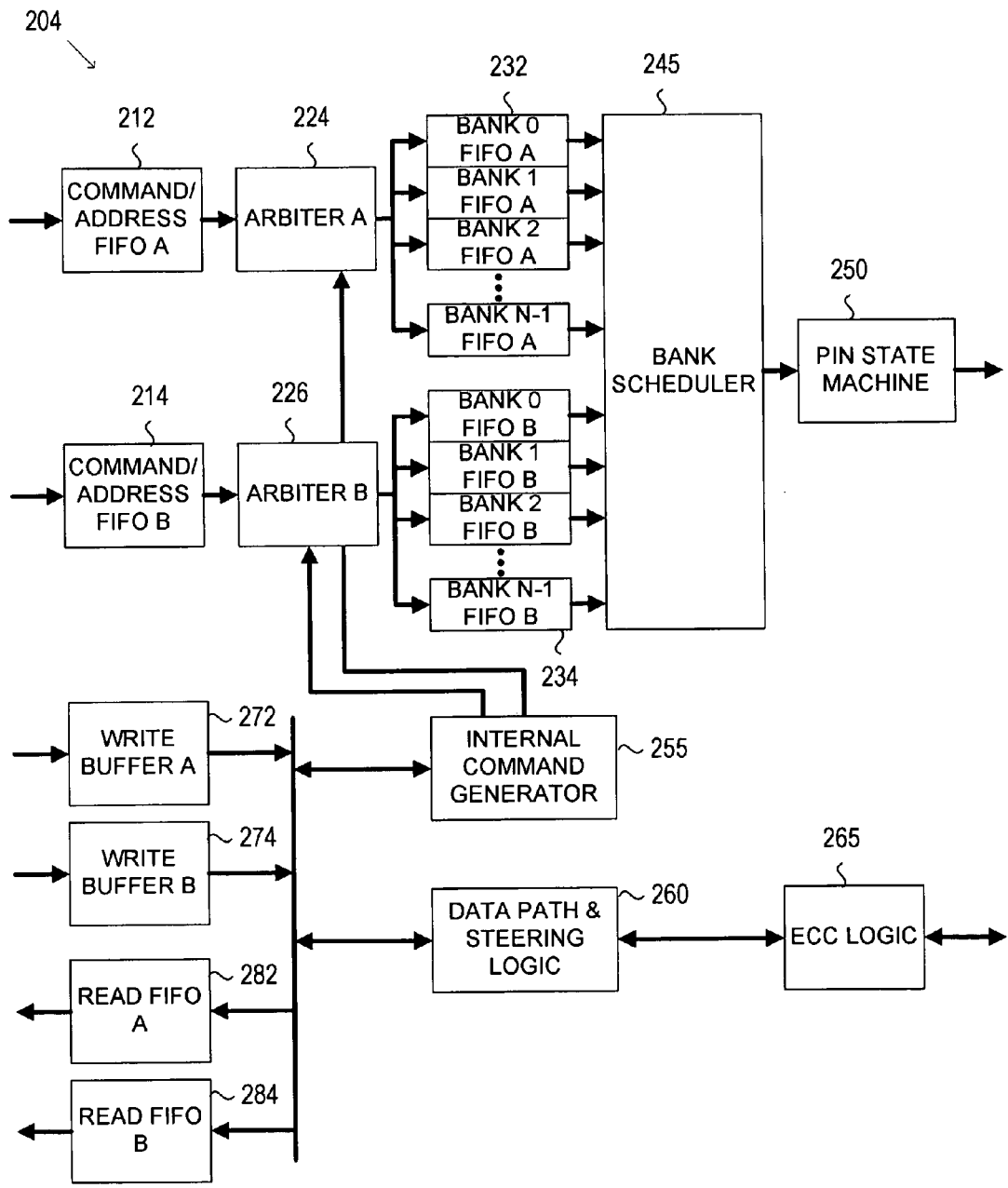

The bank FIFO set 230, the bank scheduler 240, the pin state machine 250, the internal command generator 255, the data path and steering logic 260, and the ECC logic 265 perform the same or similar functions to those described with respect to FIG. 2A FIG. 2C illustrates an example memory controller 204 that may service commands from two or more masters. Like FIG. 2B for ease of description and for clarity we will discuss the memory controller 204 receiving commands from two processors, a "coherent" processor A and a "non-coherent" processor B. The memory controller 204 includes an arbiter A 224, an arbiter B 226, a bank FIFO set A 232, a bank FIFO set B 234, a bank scheduler 245 as well as the command/address FIFO A 212, the command/address FIFO B 214, the pin state machine 250, the internal command generator 255, the data path and steering logic 260, the ECC logic 265, the write buffer A 272, the write buffer B 274, the read FIFO A 282, and the read FIFO B 284.

The pin state machine 250, the internal command generator 255, the data path and steering logic 260, and the ECC logic 265 perform the same or similar functions to those described with respect to FIGS. 2A and 2B. The command/address FIFO A 212, the command/address FIFO B 214, the write buffer A 272, the write buffer B 274, the read FIFO A 282, and the read FIFO B 284 perform the same or similar functions to those described with respect to FIG. 2B.

The output of FIFO A 212 is fed into the arbiter A 224 and the output of FIFO B 214 is fed into the arbiter B 226. The arbiter A 224 and the arbiter B 226 may use a simple round robin arbitration scheme to sort and prioritize the input coherent and non-coherent request streams respectively. The arbiters A and B 224, 226 may also arbitrate between the memory requests and commands from the internal command generator 255. The arbiters A and B 224, 226 sort the memory requests into individual banks, where the banks may be determined by examination of one or more address bits in each command/address input. The coherent requests sorted by arbiter A 224 are fed into an appropriate bank FIFO in the bank FIFO set A 232 and the non-coherent requests sorted by arbiter B 226 are fed into the appropriate bank FIFO in the bank FIFO set B 234. The bank FIFO set A 232 and the bank FIFO set B 234 each contain "N" FIFOs, where "N" is the number of banks in the target memory device (not shown).

The bank scheduler 245 receives the outputs from the bank FIFOs in the bank FIFO set A 232 and the bank FIFO set B 234. The bank scheduler 245, like the bank scheduler 240 of FIGS. 2A and 2B, picks the transactions that optimize read/write efficiency and maximize the use of memory "pin" bandwidth. The bank scheduler 245 may minimize bank conflicts by sorting, reordering, and clustering memory requests to avoid back-to-back requests of different rows in the same bank within the tRC window. The bank scheduler 245 may also group reads and/or writes to minimize read-write turnarounds. In each round, the bank scheduler 245 may select either all reads or all writes targeted to different banks and schedule these transactions. The bank scheduler 245 may also maintain a tRC timer for each bank. A bank tRC timer is started when a request is issued to that bank and the bank becomes eligible again to receive a new transaction when the timer counts down to zero.

The bank scheduler 245 may be configured to switch the transaction type at the beginning of each new round. For each round, the bank scheduler 245 may maintain a count of the number of bank FIFOs skipped because the transaction at the head of the FIFO is not of the correct type (e.g., read instead of write, write instead of read). The bank scheduler 245 may be programmed to switch if the skip count is greater than a certain value. The bank scheduler 245 may examine transactions further into each FIFO and consider more than just the head element as a candidate for the schedule ("look-at-N scheduler").

The bank scheduler 245 may arbitrate between coherent transaction requests from the bank FIFO set A 232 and non-coherent transaction requests from the bank FIFO set B 234. Arbitrating between coherent and non-coherent transaction requests may provide improved performance where there is a mismatch in the arrival rate of requests to the memory controller 204. In particular, this may overcome unfair bandwidth allocation problems when there is a significant mismatch in the arrival rate.

In each round, the bank scheduler 245 may schedule either read transactions or write transaction. In a read round, each bank FIFO within the bank FIFO set A 232 and the bank FIFO set B 234 produces a candidate request if the transaction at the head of the FIFO is a read transaction. Once all the read candidates are determined, the bank scheduler 245 makes scheduling decisions based on a number of criteria. A history bit may be used for each bank to store which bank FIFO (coherent FIFO or non-coherent FIFO) was selected in the last scheduled round. Scheduling may be performed using a simple round robin scheme.

Figure 3:
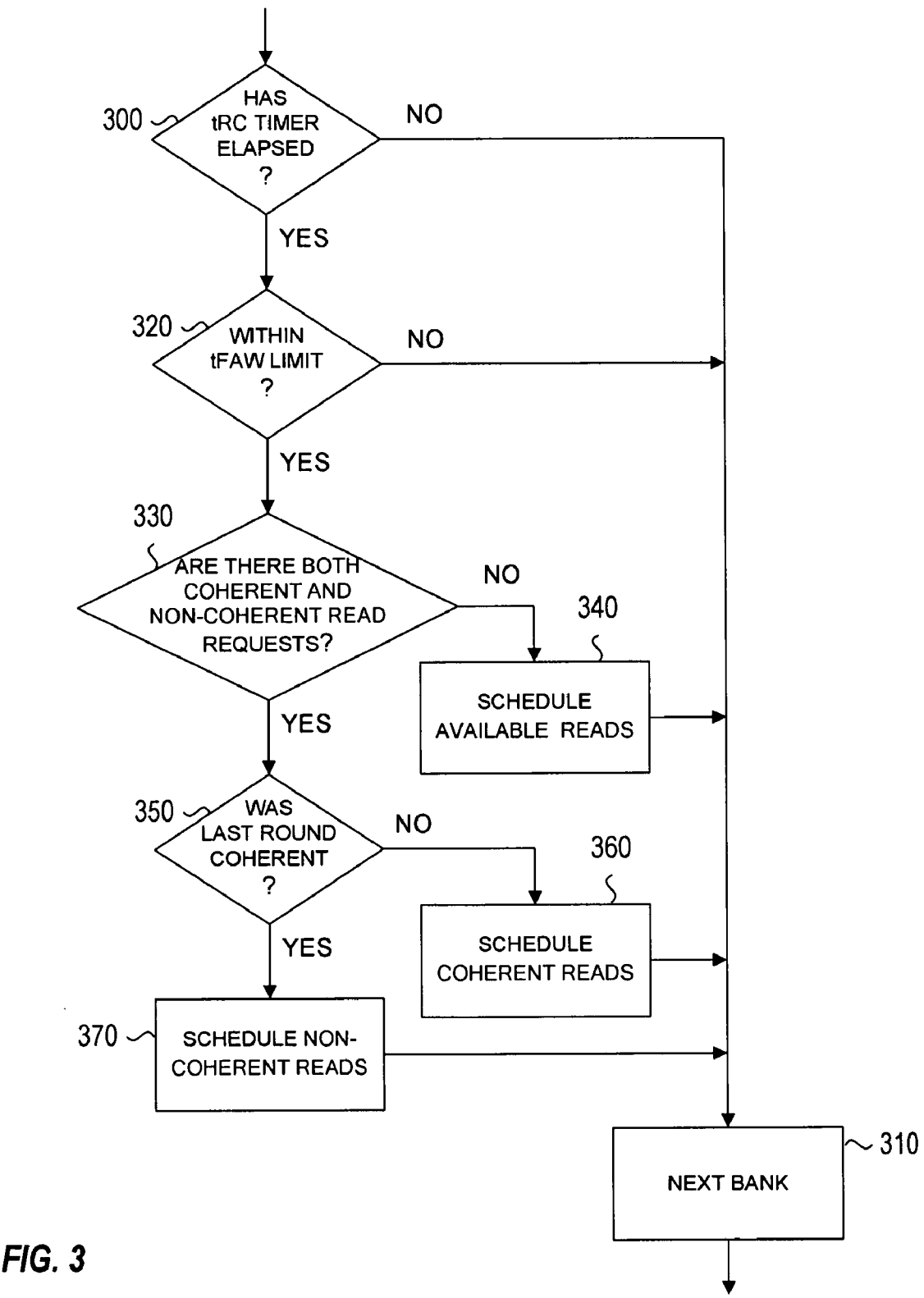
FIG. 3 illustrates an example round robin scheduling process, according to one embodiment.

FIG. 3 illustrates an example round robin read transaction decision-making process. The scheduling decision process begins by checking if the bank's tRC timer has elapsed (300). If the timer has not elapsed (300 No), the selected bank is not ready to accept a new transaction so no transactions for the current bank are processed and the process advances to the next bank (310). If the timer has elapsed (300 Yes), then a determination is made as to whether the bank is within a rolling time window (tFAW) limit—no more than four banks have been activated within tFAW (320). If the bank tFAW limit has been exhausted (320 No), then no transactions for the current bank are processed and the process advances to the next bank (310). If the bank is still within the tFAW limit (320 Yes), then the process determines if there are both coherent and non-coherent requests pending (330).

If only one type of request is pending (330 No), then that transaction is scheduled (340). If both types of requests are pending (330 Yes), then a determination is made as to whether the type of request for the last round was coherent (350). If the transaction in the last round was not a coherent one (350 No), then a coherent transaction is scheduled (360). If the transaction in the last round was a coherent one (350 Yes), then a non-coherent transaction is scheduled (370). After scheduling a transaction, the process advances to the next bank (310).

Rather than using a simple round robin process, the scheduling may be performed using a weighted round robin process. A history state (state count), comprising an M-bit number, may be kept for each bank to identify a sequence of $2^M$ rounds. Some fraction of the $2^M$ rounds may be set aside for coherent transactions and the remaining rounds are used for non-coherent transactions. By appropriately selecting the relative weights (proportion of rounds), the available memory bandwidth can be fairly distributed between (or among) slower and faster transaction request streams. For example, a 2-bit history state would enable the WRR to assign different weights to coherent and non-coherent requests for a set of four ($2^2$) rounds (e.g., 1 round for non-coherent transactions and three for coherent, 1 round for coherent transactions and three for non-coherent). Larger values of M allow for a finer grained weighting.

Figure 4:
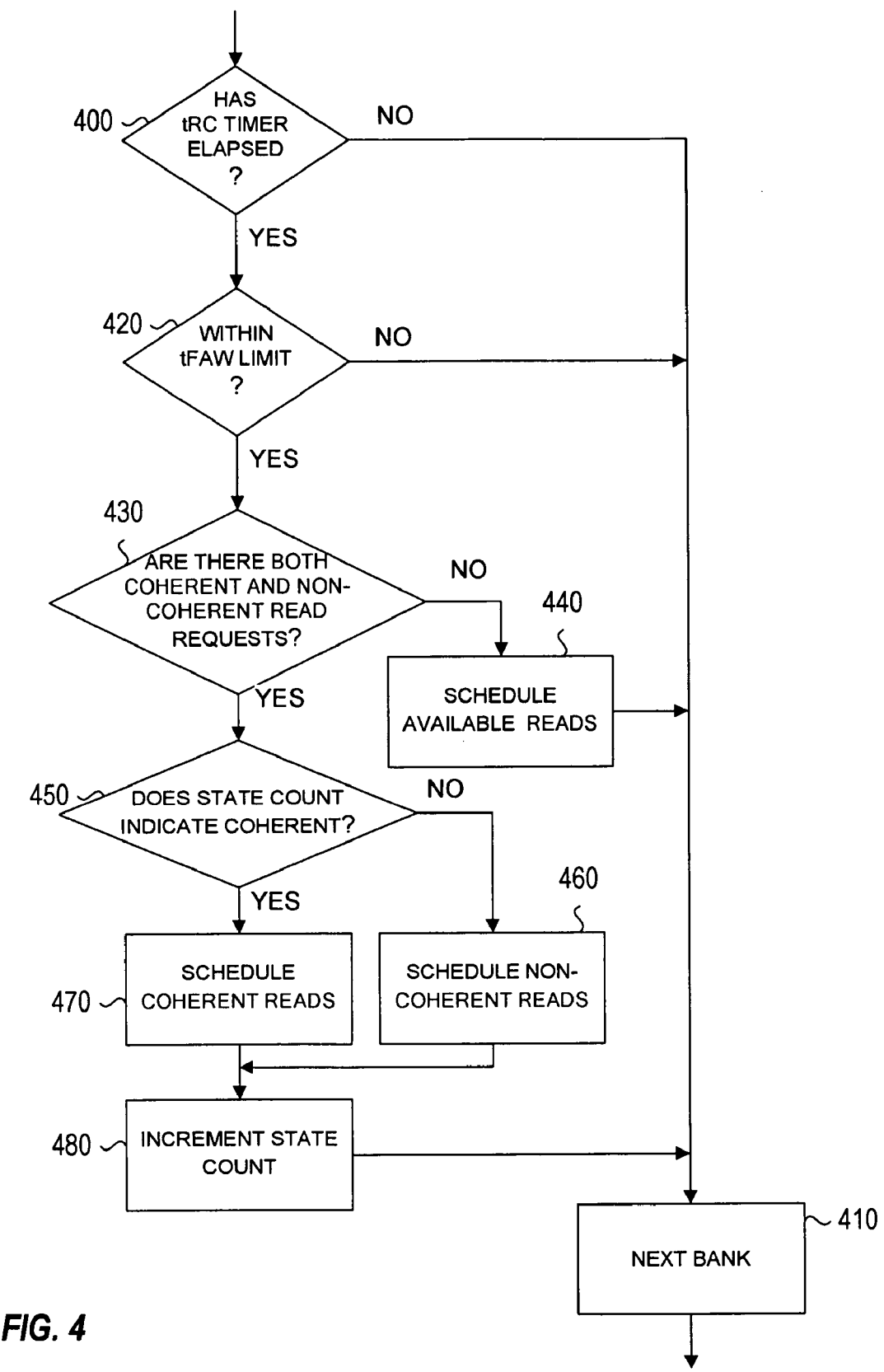
FIG. 4 illustrates an example weighted round robin scheduling process, according to one embodiment.

FIG. 4 illustrates an example weighted round robin read transaction decision-making process. The scheduling decision process begins by checking if the bank's tRC timer has elapsed (400). If the timer has not elapsed (400 No), the process advances to the next bank (410). If the timer has elapsed (400 Yes), then the tFAW parameter is checked to determine if it is within the limit (420). If the bank tFAW limit has been exhausted (420 No), then the process advances to the next bank (410). If the tFAW parameter is within limit (420 Yes), then the process determines if there are both coherent and non-coherent requests pending (430). If only one type of request is pending (430 No), then that transaction is scheduled (440).

If both types of requests are pending (430 Yes), then the state count is checked to determine if it indicates a coherent transaction (450). If the state count indicates a non-coherent transaction (450 No), then a non-coherent transaction is scheduled (460). If the state count indicates a coherent transaction (450 Yes), then a coherent transaction is scheduled (470). The state count is then incremented (480) and the process advances to the next bank (410).

The bank scheduler 245 may provide higher priority to a slower stream (e.g., the coherent stream is slower than the non-coherent stream). This ensures that, in any round, the slower stream is always selected before the faster stream. This scheduling scheme provides the best performance for the slower transaction stream.

Figure 5:
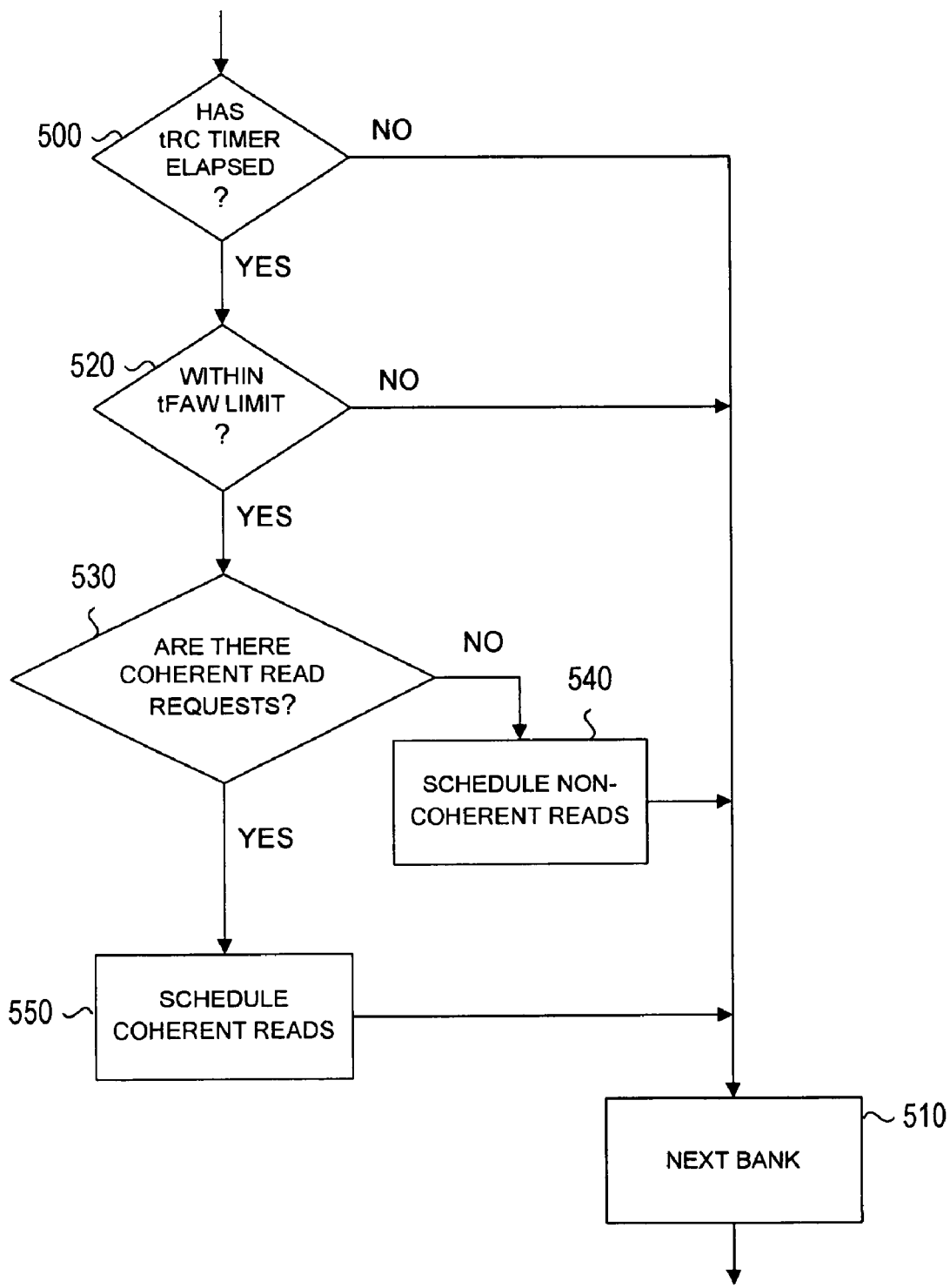
FIG. 5 illustrates an example priority scheduling process, according to one embodiment.

FIG. 5 illustrates an example priority based transaction decision-making process. The scheduling decision process begins by checking if the bank's tRC timer has elapsed (400). If the timer has not elapsed (500 No), the process advances to the next bank (510). If the timer has elapsed (500 Yes), then a determination is made as to whether the bank is within the tFAW limit (520). If out of limit (520 No), then the process advances to the next bank (510). If within limit (520 Yes), then the process determines if there are coherent requests pending (530). If no coherent requests are pending (530 No), then a non-coherent transaction is scheduled (540). If a coherent request is pending (530 Yes), then that transaction is scheduled (550). The process then advances to the next bank (510).

Although the various embodiments have been illustrated by reference to specific embodiments, it will be apparent that various changes and modifications may be made. Reference to "one embodiment" or "an embodiment" means that a particular feature, structure, or characteristic described in connection with the embodiment is included in at least one embodiment. Thus, the appearances of the phrase "in one embodiment" or "in an embodiment" appearing in various places throughout the specification are not necessarily all referring to the same embodiment.

Different implementations may feature different combinations of hardware, firmware, and/or software. It may be possible to implement, for example, some or all components of various embodiments in software and/or firmware as well as hardware, as known in the art. Embodiments may be implemented in numerous types of hardware, software and firmware known in the art, for example, integrated circuits, including ASICs and other types known in the art, printed circuit broads, components, etc.

The various embodiments are intended to be protected broadly within the spirit and scope of the appended claims.

What is claimed:

1. A memory controller comprising:
   at least one coherent command/address input buffer to receive commands and addresses for coherent streams having sequential or nearly sequential memory access, wherein the addresses specify a memory bank and a location within the memory bank;
   at least one non-coherent command/address input buffer to receive commands and addresses for non-coherent streams having non-sequential or random memory access;
   at least one coherent arbiter, coupled to said at least one coherent command/address input buffer, to merge the commands and addresses from said at least one coherent command/address input buffer and sort the commands and addresses based on the addresses specified;
   at least one non-coherent arbiter, coupled to said at least one non-coherent command/address input buffer, to merge the commands and addresses from said at least one non-coherent command/address input buffer and sort the commands and addresses based on the addresses specified;
   at least one coherent plurality of bank buffers, coupled to the at least one coherent arbiter and associated with memory banks, to store the commands and addresses for the associated memory banks;

at least one non-coherent plurality of bank buffers, coupled to the at least one non-coherent arbiter, to store the commands and addresses for the associated memory banks; and a scheduler, coupled to said at least one coherent plurality of bank buffers and at least one non-coherent plurality of bank buffers, to select the commands and addresses from said at least one coherent plurality of bank buffers and at least one non-coherent plurality of bank buffers to transact, wherein said scheduler is to operate in rounds and is to select a specific command type per round, wherein during each round said scheduler is to only select the commands and addresses having the specific command type from said at least one coherent plurality of bank buffers and at least one non-coherent plurality of bank buffers, and wherein said scheduler is to arbitrate between said at least one coherent plurality of bank buffers and said at least one non-coherent plurality of bank buffers.

2. The memory controller of claim 1, wherein said scheduler is to examine a first transaction in each one of said at least one coherent plurality of bank buffers and at least one non-coherent plurality of bank buffers considered during the round to determine if the first transaction is the specific command type.

3. The memory controller of claim 1, wherein said scheduler is to examine N transactions, where N>1, in each one of said at least one coherent plurality of bank buffers and at least one non-coherent plurality of bank buffers considered during the round to determine if any of the N transactions are the specific command type.

4. The memory controller of claim 1, wherein said scheduler includes a plurality of tRC timers associated with respective ones of said at least one coherent plurality of bank buffers and at least one non-coherent plurality of bank buffers, wherein said scheduler is to initiate a tRC timer after a respective bank buffer performs a transaction, and wherein said scheduler restricts selection of a transaction from the respective bank buffer for a period of at least tRC.

5. The memory controller of claim 1, wherein said scheduler is to change the command type per round.

6. The memory controller of claim 1, wherein said at least one coherent command/address input buffer associates a tag to received commands and addresses.

7. The memory controller of claim 1, wherein said scheduler uses a simple round robin arbitration.

8. The memory controller of claim 1, wherein said scheduler uses a weighted round robin arbitration.

9. The memory controller of claim 1, wherein said scheduler uses simple priority arbitration.

10. A memory controller comprising:
at least one command/address input buffer to receive commands and addresses, wherein the addresses specify a memory bank and a location within the memory bank;
an arbiter, coupled to said at least one command/address input buffer, to merge the commands and addresses from said at least one command/address input buffer and sort the commands and addresses based on the addresses specified;
a plurality of bank buffers, coupled to the arbiter and associated with memory banks, to store the commands and addresses for their associated memory banks; and
a scheduler, coupled to said plurality of bank buffers, to select the commands and addresses from said plurality of bank buffers to transact, wherein said scheduler is to operate in rounds and is to select a specific command type per round, wherein during each round said scheduler is to only select the commands and addresses having the specific command type from said plurality of bank buffers, and wherein said scheduler is to track a number of said bank buffers that were not processed per round because they had a wrong command type and is to end the round and change the command type when the number reaches a certain level.

11. A method comprising:
receiving coherent commands and addresses from at least one coherent source having sequential or nearly sequential memory access, wherein the addresses specify a memory bank and a location within the memory bank;
receiving non-coherent commands and addresses from at least one non-coherent source having non-sequential or random memory access;
merging the received coherent commands and addresses;
merging the received non-coherent commands and addresses;
sorting the merged coherent commands and addresses by memory bank;
sorting the merged non-coherent commands and addresses by memory bank;
buffering the coherent commands and addresses in coherent bank buffers associated with memory banks;
buffering the non-coherent commands and addresses in non-coherent bank buffers associated with the memory banks; and
scheduling the coherent commands and addresses and the non-coherent commands and addresses to be transacted, wherein said scheduling is performed in rounds by specific command type, wherein said scheduling for each round is limited to the coherent commands and addresses within the coherent bank buffers and the non-coherent commands and addresses within the non-coherent bank buffers having the specific command type, and wherein said scheduling further includes arbitrating between the coherent commands and addresses and the non-coherent commands and addresses.

12. The method of claim 11, wherein said scheduling includes examining first N transactions, where N>1, in each of the coherent bank buffers and non-coherent bank buffers considered during the round to determine if any of the first N transactions are the specific command type.

13. A memory controller comprising:
at least one coherent command/address input buffer to receive commands and addresses for coherent streams having sequential or nearly sequential memory access and at least one non-coherent command/address input buffer to receive commands and addresses for non-coherent streams having non-sequential or random memory access, wherein the addresses specify a memory bank and a location within the memory bank;
at least one coherent arbiter, associated with and coupled to said at least one coherent command/address input buffer, and at least one non-coherent arbiter associated with and coupled to said at least one non-coherent command/address input buffer, to sort the commands and addresses based on the addresses specified;
at least one coherent set of bank buffers, associated with and coupled to said at least one coherent arbiter, and at least one non-coherent set of bank buffers, associated with and coupled to said at least one non-coherent arbiter, to buffer the commands and addresses for their associated memory banks; and a scheduler, coupled to the at least one coherent set of bank buffers and the at least one non-coherent set of bank buffers, to select the commands and addresses from the at least one coherent set of bank buffers and the at least one non-coherent set of bank buffers to transact, wherein said scheduler is to operate in rounds and is to select a specific command type per round, and wherein during each round said scheduler is to only select the commands and addresses having the specific command type from the at least one coherent set of bank buffers and the at least one non-coherent set of bank buffers and is to arbitrate between the at least one coherent set of bank buffers and the at least one non-coherent set of bank buffers.

14. The memory controller of claim 13, wherein said scheduler is to examine N transactions, where N>1, in each one of said at least one coherent set of bank buffers and said at least one non-coherent set of bank buffers considered during the round to determine if any of the N transactions are the specific command type.

15. A computer comprising:

a Dynamic Random Access Memory (DRAM) device;

a processor; and a memory controller comprising:

at least one coherent command/address input buffer to receive commands and addresses for coherent streams having sequential or nearly sequential memory access and at least one non-coherent command/address input buffer to receive commands and addresses for non-coherent streams having non-sequential or random memory access, wherein the addresses specify a memory bank within said DRAM device and a location within the memory bank;

at least one coherent arbiter, coupled to said at least one coherent command/address input buffer, to merge the commands and addresses from said at least one coherent command/address input buffer and sort the commands and addresses based on the addresses specified;

at least one non-coherent arbiter, coupled to said at least one non-coherent command/address input buffer, to merge the commands and addresses from said at least one non-coherent command/address input buffer and sort the commands and addresses based on the addresses specified;

at least one coherent plurality of bank buffers, coupled to the at least one coherent arbiter and associated with memory banks, to buffer the commands and addresses for the associated memory banks;

at least one non-coherent plurality of bank buffers, coupled to the at least one non-coherent arbiter, to buffer the commands and addresses for the associated memory banks; and a scheduler, coupled to said at least one coherent plurality of bank buffers and at least one non-coherent plurality of bank buffers, to select the commands and addresses from said at least one coherent plurality of bank buffers and at least one non-coherent plurality of bank buffers to transact, wherein said scheduler is to operate in rounds and is to select a specific command type per round, wherein during each round said scheduler is to only select the commands and addresses having the specific command type, and wherein said scheduler is to arbitrate between said at least one coherent plurality of bank buffers and said at least one non-coherent plurality of bank buffers.

* * * * *